(12) United States Patent
Han et al.

(10) Patent No.: US 8,753,549 B2
(45) Date of Patent: Jun. 17, 2014

(54) THERMALLY-STABLE DIELECTRIC FLUID

(75) Inventors: Suh Joon Han, Belle Mead, NJ (US);
Dale C. Schmidt, Midland, MI (US);
Christopher J. Tucker, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/814,571

(22) PCT Filed: Sep. 15, 2011

(86) PCT No.: PCT/US2011/051787
§ 371 (c)(1),
(2), (4) Date: Feb. 6, 2013

(87) PCT Pub. No.: WO2012/037366
PCT Pub. Date: Mar. 22, 2012

(65) Prior Publication Data
US 2013/0163203 A1    Jun. 27, 2013

Related U.S. Application Data

(60) Provisional application No. 61/384,057, filed on Sep. 17, 2010.

(51) Int. Cl.
*C09K 5/00* (2006.01)
(52) U.S. Cl.
USPC ............ 252/570; 252/571; 252/572; 252/573
(58) Field of Classification Search
None
See application file for complete search history.

(56) References Cited

U.S. PATENT DOCUMENTS

| | | |
|---|---|---|
| 2,225,533 A | 12/1940 | Dewey |
| 3,115,465 A | 12/1963 | Orloff et al. |
| 6,169,190 B1 | 1/2001 | Lanuza et al. |
| 6,352,655 B1 | 3/2002 | McShane et al. |
| 6,398,986 B1 | 6/2002 | McShane et al. |
| 6,726,857 B2 | 4/2004 | Goedde et al. |
| 7,048,875 B2 | 5/2006 | Oommen et al. |
| 2002/0049145 A1 | 4/2002 | Cannon et al. |
| 2007/0197405 A1 | 8/2007 | Holmes et al. |
| 2008/0283803 A1 | 11/2008 | Rapp et al. |

FOREIGN PATENT DOCUMENTS

WO    WO2007027782    *    3/2007

OTHER PUBLICATIONS

PCT/US2011/051787, International Search Report and Written Opinion.
PCT/US2011/051787, International Preliminary Report on Patentability.

* cited by examiner

*Primary Examiner* — Necholus Ogden, Jr.

(57) ABSTRACT

The disclosure is directed to a thermally-stable dielectric fluid. The dielectric fluid includes (a) an oil, (b) a substituted, hindered phenolic antioxidant having at least two substituted cresol groups being covalently bonded to each other through a methylene bridge, and (c) a substituted, diphenyl amine antioxidant having at least two substituted phenyl groups being covalently bonded to each other through an amine bridge.

9 Claims, No Drawings

THERMALLY-STABLE DIELECTRIC FLUID

BACKGROUND

Dielectric fluids are non-conducting fluids used in a variety of applications. Those applications include transformers, capacitors, switching gears, transmission components, distribution components, switches, regulators, circuit breakers, autoreclosers, and other electrical apparatus and electrical components.

Dielectric fluids are particularly useful in transformers. When transformers are operating, the power losses occur and manifest as heat. To prevent excessive temperature rise, transformers are filled with dielectric fluids to dissipate the relatively large quantities of heat generated.

In a transformer, the dielectric fluid also provides electrical insulative properties to the internal transformer components. Notably, transformers contain electrical insulation which is utilized to prevent energized components or conductor from contacting or arcing over the other components, conductor or other internal circuitry. Heat degrades insulation. High temperatures can shorten the life of insulation.

Accordingly, thermal management of a transformer is critical to the safe operation of the transformer.

Thermal stability of the dielectric fluid is also important because of the desired service life of a transformer. For example, it is desirable that a transformer have a service life of over twenty (20) years. The dielectric fluid must be thermally stable so that it may dissipate heat and protect the insulation for more than 20 years.

Polychlorinated biphenyl compounds (also known as "PCBs"), once used as dielectric fluid in transformers, have been phased out due to their toxic properties and negative environmental impact. Non-toxic transformer oils that have replaced PCBs include fatty acid esters, fluorinated hydrocarbon oils, microbial oil, mineral oils, silicone-based hydrocarbon oils, vegetable-based oils, and vegetable seed oils. These non-toxic oils have drawbacks regarding viscosity, flash point, fire point, pour point, water saturation point, dielectric strength and/or other properties limiting their usefulness as dielectric fluids.

For example, vegetable oils are friendly to the environment, have excellent dielectric characteristics, high temperature stability, superior flash and fire resistance, and are compatible with solid insulating materials. However, vegetable oils have high pour point, thereby yielding a typical temperature operating window of vegetable oil-based dielectric fluids −15 degrees Celsius to 110 degrees Celsius. Additionally, when compared to mineral oils, vegetables are more viscous and less thermally stable.

Mineral oil-based dielectric fluids are not free of concerns. A key disadvantage of mineral oil is its fire point near at 150 degrees Celsius, which is much lower than that of the vegetable oil or other less flammable fluids such as silicon oil.

Consequently, a need exists for a non-toxic, biodegradable, PCB-free dielectric fluid for electrical components that have the same, or substantially the same, chemical, mechanical, and/or physical properties as PCB-based dielectric fluid.

SUMMARY

The present disclosure is directed to a thermally-stable dielectric fluid for use in transformers, switching gears, electrical cables, electric generation, transmission, and distribution power equipment.

In an embodiment, a dielectric fluid is provided and includes (a) an oil, (b) a substituted, hindered phenolic antioxidant, and (c) a substituted, diphenyl amine antioxidant.

In another embodiment, a device is provided and includes an electrical component and a thermally-stable dielectric fluid in operative communication with the electrical component.

In another embodiment, a first process is provided and includes placing a thermally-stable dielectric fluid in operative communication with an electrical component. The process further includes cooling the electrical component with the thermally-stable dielectric fluid.

In another embodiment, a second process is provided and includes placing a thermally-stable dielectric fluid in operative communication with an electrical component. The second process further includes insulating the electrical component with the thermally-stable dielectric fluid.

An advantage of the present disclosure is a thermally-stable dielectric fluid.

An advantage of the present disclosure is an improved antioxidant composition for dielectric fluid applications.

DETAILED DESCRIPTION

The present disclosure is directed to a dielectric fluid. The dielectric fluids provided herein are suitable for use with an electrical component and transformers in particular.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent U.S. version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, flash point, viscosity, dielectric strength, percent weight, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts for components in the fluid and/or composition, additives, and various other components in the composition, and the various characteristics and properties by which these components are defined.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

"Algae," as used herein, is any autotrophic organism capable of photosynthesis that lives in water (either freshwater and/or saltwater). The term "algae" includes diatoms (Bacillariophyceae), green algae (Chlorophyceae), blue-green algae (Cyanophyceae), golden algae (Chrysophyceae), brown algae, and/or red algae. The algae can be any algae species including macro algae, micro algae, marine algae, or freshwater algae. Nonlimiting examples of suitable algae include *chiarella vulgaris, haematococcus, stichochoccus*, bacillariophyta (golden algae), cyanophyceae (blue green algae), chlorophytes (green algae), *chlorella, botryococcus braunii*, cyanobacteria, prymnesiophytes, coccolithophorads, *neochloris oleoabundans, scenedesmus dimorphus, atelopus dimorphus, euglena gracilis, dunalielia, dunaliella salina, dunaliella tertiolecta*, diatoms, bacillariophyta, chlorophyceae, *phaeodactylum tricornutunum*, stigmatophytes, dictyochophytes, and pelagophytes. The algae may be single cells, colonies, clumps, filamentous and any combination thereof.

"Algae oil," as used herein, is an oil derived from algae. Algae oil is a mixture of unsaturated/saturated triglycerides of fatty acids. The fatty acids have a carbon chain ranging from 16 to 22 carbon atoms. If the carbon chain has no double bonds, it is a saturated oil, and is designated Cn:0 where n is the number of carbon atoms. Chains with one double bond are monounsaturated and are designated Cn:1; with two double bonds, it will be Cn:2 and with three double bonds Cn:3. For example, oleic acid is a C18:1 fatty acid while erucic acid is a C22:1 fatty acid. The algae may be genetically modified or otherwise selected to produce algae oil with a high content of mono unsaturated triglycerides or a low content of polyunsaturated triglycerides. Similarly, the algae oil may be partially or fully hydrogenated or otherwise processed to increase the saturation of the triglycerides or functionalized with chemical groups. For example, genetically-modified algae and/or post-extraction algae oil hydrogenation may produce algae oil composed of triglycerides with greater than 20 wt % to 90 wt % oleic acid (C18:1). Nonlimiting procedures suitable to extract triglycerides from algae include expeller/press, solvent extraction, supercritical fluid extraction, enzymatic extraction, osmotic shock, electromechanical extraction, and any combination of the foregoing. The algae oil can be functionalized. Nonlimiting examples of suitable functionalizations for the algae oil include hydrogenation (full or partial), acetylation, epoxidization, transesterification, and amidization.

"Antioxidant" is a molecule capable of slowing or preventing the oxidation of other molecules.

"Blend," "fluid blend" and like terms is a blend of two or more fluids, as well as blends of fluids with various additives. Such a blend may or may not be miscible. Such a blend may or may not be phase separated. Such a blend may or may not contain one or more domain configurations, as determined from light scattering, and any other method known in the art.

"Composition" and like terms is a mixture or blend of two or more components.

"Dielectric breakdown voltage," "dielectric strength," "dielectric breakdown," or "breakdown strength" (in MV/m or kV/mm) is the maximum electric field strength that a dielectric fluid can withstand intrinsically without breaking down and a measure of the liquid's ability to withstand electric stress without failure. The dielectric strength is measured by taking 100-150 ml oil sample in a test cell and applying a voltage between test electrodes separated by a specified gap. The test is preferably run five times and the average value is calculated. The dielectric breakdown voltage or dielectric strength is determined using ASTM D 877 or ASTM D 1816.

"Dielectric fluid" is a non-conducting fluid having a dielectric breakdown greater than 20 kV as measured in accordance with ASTM D 1816 (VDE electrodes, 1 mm gap) and/or a dissipation factor of less than 0.2% as measured in accordance with ASTM D 924 (60 Hz, 25° C.), and less than 4 at 100° C. (ASTM D 924, 60 Hz). A dielectric fluid provides coolant and/or insulative properties when placed in operative communication with an electrical component.

"Dissipation factor," "dielectric constant," or "power constant" is a measure of the electrical loss due to conducting species and is tested by measuring the capacitance of fluids in a test cell using a capacitance bridge. The dissipation factor is determined using ASTM D 924.

"Electrical conductivity" is measured using a conductivity meter such as an Emcee meter. The electrical conductivity is determined in accordance with ASTM D 2624.

"Fatty acid ester," as used herein, includes, as nonlimiting examples, myristoleic ester, palmitoleic ester, sapienic ester, oleic ester, linoleic ester, linolenic ester, arachidonic ester, eicosapentaenoic ester, erusic ester, docosahexaenoic ester, stearic acid methyl ester, palmitic acid methyl ester, oleic acid methyl ester, and lauric acid methyl ester.

"Flash point" is the temperature of the fluid that will result in an ignition of the fluid's vapors when exposed to air and an ignition source. The flash point is determined by placing a fluid sample in a flashpoint tester and determining the temperature at which it ignites in accordance with ASTM D 92.

"Fire point" is the temperature of the fluid at which sustained combustion occurs when exposed to air and an ignition source. Fire point is determined in accordance with ASTM D-92.

"Metal deactivator," as used herein, includes additives used to stabilize fluids by deactivating metal ions. Essentially, metal deactivators are believed to inhibit the catalytic effects of such metal ions.

"Microbe," as used herein, includes prokaryotic organisms, microbes that perform photosynthesis, microalgae cells, yeast, and/or fungus. The microbe may be genetically engineered or selected to express a lipid pathway enzyme. For example, the microbe may be microalgae cell, an oleaginous yeast, or a fungus containing an exogenous gene that encodes a protein selected from a lipase, sucrose transporter, sucrose invertase, fructokinase, polysaccharide-degrading enzyme, a fatty acyl-ACP thioesterase, a fatty acyl-CoA/aldehyde reductase, a fatty acyl-CoA reductase, a fatty aldehyde reductase, a fatty aldehyde decarbonylase, and an acyl carrier protein (ACP). Nonlimiting examples of suitable microbes include microbes from the genus *chromydomonas*, or *chromydomonas reinhardtii*; and *E. coli*.

"Microbial oil," as used herein, is an oil derived from a microbe. The algae oil microbial oil can be functionalized. Nonlimiting examples of suitable functionalizations for the microbial oil include hydrogenation (full or partial), acetylation, epoxidization, transesterification, and amidization.

"Mineral oil," as used herein, is composed mainly of alkanes. Nonlimiting examples of mineral oils include poly alpha olefins. Poly(α-olefin)s are derived from the polymerization of α-olefin such as butane (C4), hexane (C6), octane (C8), decence (C10) or dodedence (C12) or more hydrocarbon branched α-olefin. The poly(α-olefin) can be a single oligomer and mixture of oligomers of α-olefins.

"Natural algae antioxidant," as used herein, is an antioxidant that is produced by the algae. Nonlimiting examples of natural algae antioxidant include astaxanthin, beta-carotene, tocopherol, polyunsaturated triglycerides, and combinations thereof. A nonlimiting example of an algae that naturally produces astaxanthin is *Haematococcus pluvialis*, a green microalgae. Astaxanthin accumulates naturally in green algae.

"Oxidation" is a chemical reaction that transfers electrons from a substance to an oxidizing agent. Oxidation reactions can produce reactive free radicals, which can degrade a composition. Antioxidants can terminate free radicals.

"Oxidation Induction Time" or "OIT" is the primary means of determining the resistance of the dielectric fluid to oxidation. An oil specimen in the weight of 10-15 mg is prepared. Using a differential scanning analysis (DSC) instrument and starting at room temperature, the temperature of the oil specimen is increased at a constant ramp rate of 10 degrees Celsius per minute in a nitrogen environment. As the temperature increases to the specific isothermal temperature and after complete melting of the specimen, the nitrogen environment is switched to an oxidative environment occurs. The test concludes when an exothermic oxidation curve is observed in the thermogram.

"Oxygen stability index method" is the point of maximum change of the rate of oxidation. In the AOCS official method Cd 12b-92, a stream of purified air is passed through a sample of oil, which is held in a thermal bath. The effluent air from the oil sample is then bubbled through a vessel containing deionized water. The conductivity of the water is continuously monitored. Any volatile organic acids from the oil sample are swept by the effluent air. The presence of the volatile organic acids in the effluent air increases the conductivity of water as oxidation proceeds.

"Pour point" is the lowest temperature at which a liquid will pour or flow under prescribed conditions. The pour point is determined by cooling an oil sample with dry ice/acetone and determining the temperature at which the liquid becomes a semi-solid. The pour point is determined using ASTM D 97.

"Triglyceride" is a glycerol backbone linked to three fatty acid molecules.

"Vegetable-based oil," as used herein, includes lipid materials derived from plants. Nonlimiting examples of suitable vegetable oils include coconut oil, corn oil, hemp oil, olive oil, palm oil, rapeseed/canola oil, safflower oil, soya oil, sunflower oil, and wheat germ oil.

"Vegetable seed oil," as used herein, includes lipid materials derived from the seeds of plants. Nonlimiting examples of suitable vegetable seed oils include oils extracted from seeds of blackcurrant seed oil, borage seed oil, bottle gourd oil, buffalo gourd oil, carob seed pods, coconut oil, coriander seed oil, corn seed oil, cottonseed oil, flax seed/linseed oil, grape seed oil, hemp oil, kapok seed oil, kenaf seed oil, meadowfoam seed oil, okra/hibiscus seed oil, olive oil, palm oil, papaya seed oil, perilla seed oil, pequi seed oil, poppy seed oil, pumpkin seed oil, ramtil seed oil, rapeseed/canola oil, royle seed oil, safflower oil, sesame oil, soya oil, sunflower oil, tea seed/camellia oil, tomato seed oil, watermelon seed oil, and wheat germ oil.

"Viscosity" is the measurement of the resistance of a fluid to flow. Viscosity is measured in accordance with ASTM D 445, Brookfield-Viscosimeter.

"Viscosity—Aged," as used herein, is the measurement of the viscosity after aging a dielectric fluid for seven (7) weeks at 100 degrees Celsius in air.

"Volume Resistivity" is a resistance to leakage current through the body of an insulating material. The ratio of the potential gradient parallel to the current in a material to the current density. Under the International System of Units, volume resistivity is numerically equal to the direct-current resistance between opposite faces of a one-meter cube of the material (ohm-m). A lower volume resistivity indicates more conduction in insulation medium.

"Water saturation point" is the percentage of saturation of water in the dielectric fluid. The water saturation point is a function of the temperature and chemical structure of the dielectric fluid. As the water saturation point increases, the dielectric strength generally decreases. Water saturation point is determined in accordance with ASTM D 1533.

The present disclosure provides a dielectric fluid. The dielectric fluid includes (a) an oil selected from the group consisting of algae oils, fatty acid esters, microbial oil, mineral oils, vegetable-based oils, and vegetable seed oils, (b) a substituted, hindered phenolic antioxidant having at least two substituted cresol groups being covalently bonded to each other through a methylene bridge of the structure

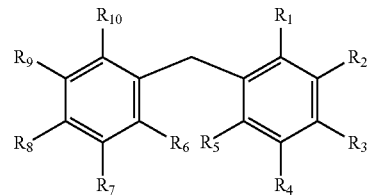

wherein R1-R10 is a hydrogen, a hydroxyl group, an alkyl group, an alkenyl group, an alkoxy group, or an aryl group and where at least one of R1-R5 and at least one of R6-R10 is an hydroxyl group, at least one of R1-R5 and at least one of R6-R10 is a methyl group, and at least one of R1-R5 and at least one of R6-R10 is an alkyl, alkenyl, or alkoxy group that may be straight-chained or branched or an aryl group and the alkyl, alkenyl, alkoxy, or aryl group may be substituted or unsubstituted, and (c) a substituted, diphenyl amine antioxidant having at least two substituted phenyl groups being covalently bonded to each other through an amine bridge of the structure

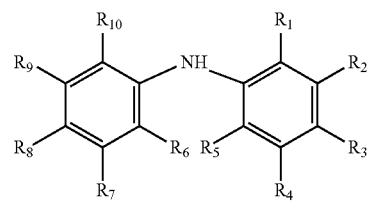

wherein R1-R10 is, independently, a hydrogen, an alkyl group, an alkenyl group, an alkoxy group, an aryl group, or a vinyl benzyl group, when R1-R10 is an alkyl group, an alkenyl group, or an alkoxy group that group may be straight-chained or branched and may be substituted or unsubstituted, and when R1-R10 is an aryl group that group may be substituted or unsubstituted. Preferably, the alkyl group has up to about 16 carbon atoms. Preferred alkyl substituents include t-butyl, 1-penthyl, hexyl, n-octyl, t-octyl, nonyl, decyl, and dodecyl.

The oil used in the dielectric fluid is selected from the group consisting of algae oils, fatty acid esters, microbial oil, mineral oils, vegetable-based oils, and vegetable seed oils including high-oleic vegetable seed oils. The oil is preferably a vegetable seed oil, more preferably a canola oil and still more preferably a "high-oleic" canola oil. As used herein, "high-oleic means that an oil has an oleic acid (C18:1) content of at least 70 percent by weight, based upon total weight of the oil, e.g. an oleic acid content of between 71 and 75 weight percent, based upon total weight of the oil.

Preferably, the total, combined amount of the substituted, hindered phenolic antioxidant and the substituted, diphenyl amine antioxidant is from 0.1% to 5.0 weight percent (wt %), based on the total weight of the dielectric fluid composition. More preferably, the amount is from 0.5 to 3.0 wt %, and most preferably, it is from 0.8 to 2.0 wt %.

In this embodiment, nonlimiting examples of suitable substituted, hindered phenolic antioxidant include 2,2'-methylenebis(4-methyl-6-tert-butylphenol) and 4,4'-methylenebis (2,6-di-tertiary-butylphenol).

In this embodiment, nonlimiting examples of suitable substituted, diphenyl amine antioxidant include N,N' dioctyl-diphenylamine, di-β-naphtyl-para-phenylenediamine, reaction products of n-phenylbenzenamine and 2,4,4-trimethylpentane (IRGANOX 1-57), nonylated diphenylamine (Naugalube 438L), butyl octyl diphenyl amine, and dicumyl diphenyl amine.

In this embodiment, the dielectric fluid may further include natural algae antioxidant.

In this embodiment, the dielectric fluid may further include a metal deactivator. Nonlimiting examples of suitable metal deactivators include copper deactivator and aluminum deactivator. Examples of copper deactivator are benzotriazole derivatives. Nonlimiting examples of other suitable metal deactivators include 2',3-bis[[3-[3,5-di-tert-butyl-4-hydroxyphenyl]propionyl]]proponiohydrazine, benzo-triazole fatty amine salt, 1-(di-isooctylaminomethyl)-1,2,4-triazole, 1-(2-methoxyprop-2-yl)tolyltriazole, 1-(1-cyclohexyloxypropyl) tolyltriazole, 1-(1-cyclohexyloxyheptyl)tolyltriazole, 1-(1-cyclohexyloxybutyl)tolyltriazole, 1-[bis(2-ethylhexyl) aminomethyl-4-methylbenzotriazole, triethyl borate, tripropyl borate, triisopropyl borate, tributyl borate, tripentyl borate, trihexyl borate, tricyclohexyl borate, trioctyl borate, triisooctyl borate, and N,N-bis(2-Ethylhexyl)-ar-methyl-1H-benzotriazole-1-methanamine.

In this embodiment, the dielectric fluid may further include pour points depressants when low pour points are desired. Two (2) weight percent or less (based on total weight dielectric fluid) of a pour point depressant will typically reduce the pour point of the dielectric fluid by 10 to 15 degrees Celsius. Nonlimiting examples of suitable pour point depressants include methacrylic acid ester, polymethacrylate (PMA), polyalkyl methacrylate, fatty acid alkyl esters from fatty acids, polyvinyl acetate oligomers, and acrylic oligomers.

In this embodiment, the pour point may be further reduced by winterizing the dielectric fluid. The dielectric fluid is winterized by lowering the temperature to near or below 0 degrees Celsius and removing solidified components. The winterization process may be performed as a series of temperature reductions followed by removal of solids at the various temperatures. Winterization may be performed by reducing the temperature serially to 5, 0 and −12 degrees Celsius for several hours, and filtering the solids with diatomaceous earth.

The present dielectric fluid may comprise two or more embodiments disclosed herein.

The present disclosure provides a device. The device includes an electrical component and the present dielectric fluid in operative communication with the electrical component. Nonlimiting examples of suitable electrical components include a transformer, a capacitor, a switching gear, a transmission component, a distribution component, a switch, a regulator, a circuit breaker, an autorecloser, or like components, etc., and/or combinations thereof.

The dielectric fluid is in operative communication with the electrical component. As used herein, "operative communication" is a configuration and/or a spatial relationship enabling the dielectric fluid to cool and/or insulate the electrical component. Operative communication thereby includes the following configurations: dielectric fluid, in, on, around, adjacent to, contacting, surrounding (wholly or partially) through, and/or in proximity to the electrical component; and the electrical component immersed (wholly or partially) in the dielectric fluid.

In an embodiment, the electrical component is a transformer. A transformer is a device that transfers electrical energy from one circuit to another through inductively coupled conductors—i.e., the transformer's coils. Transformers are classified in terms of power capacity or system voltage, which in turn relates to the application of the transformer in electric power grids. A distribution transformer has a system voltage typically in the range of 36 kV or less. A power transformer has a system voltage typically in the range of 36 kV or greater.

In an embodiment, the transformer is a distribution transformer. A distribution transformer includes primary and secondary coils or windings in a housing or a tank and a dielectric fluid in the tank in operative communication with the windings. The windings are insulated from each other, via the dielectric fluid, and are wound around a common core of magnetically suitable material, such as iron or steel. The core and/or the windings may also have laminations, insulative coatings or insulation paper materials to further insulate and absorb heat. The core and windings are immersed in the dielectric fluid, allowing free circulation of the fluid. The dielectric fluid covers and surrounds the core and windings. The dielectric fluid completely fills all small voids in the insulation and elsewhere within the housing. The transformer housing provides an air-tight and fluid-tight seal around the tank preventing ingress of air and/or contaminants which may collect and eventually cause failure of the transformer.

In order to improve the rate of heat transfer from the core and coil assembly, the transformer may include additional structures for providing increased cooling, such as fins on the tank that are provided to increase the surface area available to provide cooling, or radiators or tubes attached to the tank that are provided so that the hot fluid that rises to the top of the tank may cool as it circulates through the tubes and returns at the bottom of the tank. These tubes, fins or radiators provide additional cooling surfaces beyond those provided by the tank walls alone. Fans may also be provided to force a current of air to blow across the heated transformer enclosure, or across radiators or tubes to better transfer the heat from the hot dielectric fluid and heated tank to the surrounding air. Also, some transformers include a forced oil cooling system which includes a pump to circulate the dielectric fluid from the bottom of the tank through pipes or radiators to the top of the tank (or from the tank to a separate and remote cooling device and then back to the transformer).

The examples (Ex. 9-14) demonstrated longer oxidation induction times than their respective comparative examples (C.E. 2-7). Moreover, none of the exemplified compositions resulted in gelled fluids after aging 7 weeks at 100 degrees Celsius in air.

| Components | C.E. 1 | C.E. 2 | C.E. 3 | C.E. 4 | C.E. 5 | C.E. 6 | C.E. 7 | C.E. 8 | Ex. 9 | Ex. 10 | Ex. 11 | Ex. 12 | Ex. 14 | Ex. 15 |
|---|---|---|---|---|---|---|---|---|---|---|---|---|---|---|
| Oil | 98.4 | 98.4 | 98.4 | 98.4 | 98.4 | 98.4 | 98.4 | 98.4 | 98.4 | 98.4 | 98.4 | 98.4 | 98.4 | 98.4 |
| Irganox L109 | 1.6 | 1.28 | 0.96 | 1.28 | 0.96 | 1.28 | 0.96 | | | | | | | |
| Vanox MBPC | | | | | | | | 1.6 | 1.28 | 0.96 | 1.28 | 0.96 | 1.28 | 0.96 |
| Irganox L57 | | 0.32 | 0.64 | | | | | | 0.32 | 0.64 | | | | |
| Irganox L74 | | | | 0.32 | 0.64 | | | | | | 0.32 | 0.64 | | |
| Naugalube 438 L | | | | | | 0.32 | 0.64 | | | | | | 0.32 | 0.64 |
| Total | 100 | 100 | 100 | 100 | 100 | 100 | 100 | 100 | 100 | 100 | 100 | 100 | 100 | 100 |
| Tests | | | | | | | | | | | | | | |
| Oxidation Induction Time | 51 | 47 | 55 | 77 | 68 | 65 | 60 | 134 | 150 | 93 | 147 | 114 | 110 | 84 |
| Viscosity - Aged, centipoise | 391 | 174 | gelled | gelled | gelled | gelled | gelled | 122 | 124 | 144 | 119 | 109 | 127 | 194 |

Other embodiments are also possible and are not limited to use in a transformer.

In an embodiment, the present disclosure provides a process that comprises placing a dielectric fluid in operative communication with an electrical component. The process further includes cooling the electric component with the dielectric fluid. The electrical component may include any one of a transformer, a capacitor, a switching gear, a transmission component, a distribution component, a switch, a regulator, a circuit breaker, an autorecloser, and the like and/or combinations thereof.

In an embodiment, the present disclosure provides a process that comprises placing a dielectric fluid in operative communication with an electrical component. The process further includes insulating the electric component with the dielectric fluid. The electrical component may include any one of a transformer, a capacitor, a switching gear, a transmission component, a distribution component, a switch, a regulator, a circuit breaker, an autorecloser, and the like and/or combinations thereof.

EXAMPLES

The following nonlimiting examples illustrate the invention:

Comparative Examples 1-8 and Examples 9-14

For the examples, a high-oleic canola made by Dow AgroSciences LLC was used. The oil had an oleic acid (C18:1) content between 71 and 75 weight percent and an oxygen induction time at 170 degrees Celsius of 7 minutes. The antioxidants evaluated included (a) VANOX MBPC 2,2'-methylene-bis(4-methyl-6-tert-butylphenol), which is commercially available from R.T. Vanderbilt Company, Inc., (b) IRGANOX L-109 bis(3,5-di-tert-butyl-4-hydroxyhydrocinnamate, which is commercially available from BASF Corporation, (c) IRGANOX L-57 reaction products of n-phenylbenzenamine and 2,4,4-trimethylpentane, which is commercially available from BASF Corporation, (d) IRGANOX L-74 dialkyl diphenylamine, which is commercially available from BASF Corporation, and (e) Naugalube 438L nonylated diphenylamine, which is commercially available from Chemtura Corporation.

Examples 15-17

For the examples, a high-oleic canola made by Dow AgroSciences LLC was used. The oil had an oleic acid (C18:1) content between 71 and 75 weight percent and an oxygen induction time at 170 degrees Celsius of 7 minutes. The antioxidants evaluated included (a) VANOX MBPC 2,2'-methylene-bis(4-methyl-6-tert-butylphenol), which is commercially available from R.T. Vanderbilt Company, Inc. and (b) Naugalube 438L nonylated diphenylamine, which is commercially available from Chemtura Corporation.

| | Ex. 15 | Ex. 16 | Ex. 17 |
|---|---|---|---|
| Component | | | |
| Oil | 98.8 | 98.4 | 98.4 |
| Vanox MBPC | 0.6 | 0.6 | 1 |
| Naugalube 438L | 0.6 | 1 | 0.6 |
| Total | 100 | 100 | 100 |
| Tests | | | |
| Dissipation Factor at 25 degrees Celsius, percent | 0.07 | 0.08 | 0.09 |
| Dissipation Factor at 100 degrees Celsius, percent | 2.67 | 3.48 | 3.39 |
| Dielectric constant at 25 degrees Celsius | 3.09 | 3.09 | 3.09 |
| Dielectric constant at 25 degrees Celsius | 2.79 | 2.83 | 2.84 |
| Volume resistivity at 25 degrees Celsius, $10^{11}$ ohm m | 1.48 | 1.38 | 1.18 |
| Breakdown strength 1 mm gap, kV (ASTM D-1816) | 26~32 | 26~32 | 26~32 |
| Pour point, degrees Celsius | -21~-25 | -21~-25 | -21~-25 |
| Fire point, degrees Celsius | 330 | 330 | 330 |

The examples (Ex. 15-18) demonstrated that a thermally-stable, high-oleic canola based-oil provides (a) a dissipation factor at 25 degrees Celsius of less than 0.2%, (b) a dielectric constant at 25 degrees Celsius of at least less than 3.5, (c) a volume resistivity at 25 degrees Celsius of greater than $1 \times 10^9$ ohm meter, (d) a breakdown strength of at least 20 kV/1 mm gap, (e) a pour point at least -15 degrees Celsius, and (f) a fire point greater than 300 degrees Celsius.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A dielectric fluid comprising:
   (a) an oil selected from the group consisting of algae oils, fatty acid esters, microbial oil, mineral oils, vegetable-based oils, and vegetable seed oils and;
   (b) a substituted, hindered phenolic antioxidant having at least two substituted cresol groups being covalently bonded to each other through a methylene bridge of the structure

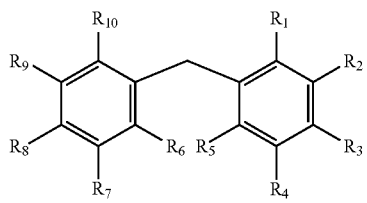

wherein R1-R10 is a hydrogen, a hydroxyl group, an alkyl group, an alkenyl group, an alkoxy group, or an aryl group and where at least one of R1-R5 and at least one of R6-R10 is an hydroxyl group, at least one of R1-R5 and at least one of R6-R10 is a methyl group, and at least one of R1-R5 and at least one of R6-R10 is an alkyl, alkenyl, or alkoxy group that may be straight-chained or branched or an aryl group and the alkyl, alkenyl, alkoxy, or aryl group may be substituted or unsubstituted; and (c) a substituted, diphenyl amine antioxidant having at least two substituted phenyl groups being covalently bonded to each other through an amine bridge of the structure

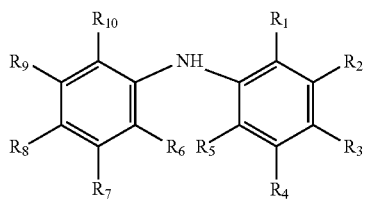

wherein R1-R10 is, independently, a hydrogen, an alkyl group, an alkenyl group, an alkoxy group, an aryl group or a vinyl benzyl group, when R1-R10 is an alkyl group, an alkenyl group, or an alkoxy group that group may be straight-chained or branched and may be substituted or unsubstituted, and when R1-R10 is an aryl group that group may be substituted or unsubstituted.

2. The dielectric fluid of claim 1 further comprising at least one of a natural algae antioxidant, a metal deactivator or a pour point depressant.

3. The dielectric fluid of claim 1 wherein the oil is a vegetable seed oil selected from canola oil and high-oleic canola oil.

4. The dielectric fluid of claim 3 wherein the vegetable seed oil is a high-oleic canola oil.

5. A device comprising:
   (a) an electrical component and
   (b) the dielectric fluid of claim 1 in operative communication with the electrical component.

6. The device of claim 5 wherein the electrical component is selected from the group consisting of a transformer, a capacitor, a switching gear, a transmission component, a distribution component, a switch, a regulator, a circuit breaker, an autorecloser, and combinations thereof.

7. A process comprising the steps of:
   (a) placing the dielectric fluid of claim 1 in operative communication with an electrical component and
   (b) cooling the electrical component with the dielectric fluid.

8. A process comprising the steps of:
   (a) placing the dielectric fluid of claim 1 in operative communication with an electrical component and
   (b) insulating the electrical component with the dielectric fluid.

9. The process of claim 7 wherein the electrical component is selected from the group consisting of a transformer, a capacitor, a switching gear, a transmission component, a distribution component, a switch, a regulator, a circuit breaker, an autorecloser, and combinations thereof.

* * * * *